United States Patent [19]

Cook

[11] 4,200,657
[45] Apr. 29, 1980

[54] LOW AIR FLOW FUMIGATION METHOD

[76] Inventor: James S. Cook, P.O. Box 5421, Houston, Tex. 77021

[21] Appl. No.: 958,984

[22] Filed: Nov. 9, 1978

[51] Int. Cl.² .............................................. A23L 3/34
[52] U.S. Cl. ........................................ 426/419; 422/1;
422/28; 422/29; 422/32; 422/40; 426/312;
426/320; 426/418
[58] Field of Search ...................... 422/32, 28, 29, 31,
422/40, 5, 34, 35, 36, 37, 292, 1; 426/312, 320,
418, 419

[56] References Cited

U.S. PATENT DOCUMENTS

| 1,613,186 | 1/1927 | Moffett ............................. 426/319 |
| 2,461,649 | 2/1949 | Manning ........................... 422/32 X |
| 3,041,684 | 7/1962 | Dawson et al. .................... 422/32 X |

Primary Examiner—Barry S. Richman
Attorney, Agent, or Firm—Charles H. De La Garza

[57] ABSTRACT

A method of treating an agricultural product, including the steps of placing the product within a storage container; providing a forced air supply to the container; introducing a gaseous chemical into the container, the particular chemical being selected for minimal sorption of the chemical by the product; and circulating the air and chemical mixture within the container through the product at a low rate of flow, utilizing the forced air supply, for a time sufficient to evenly distribute the chemical throughout the product volume. The rate at which the air is circulated is less than approximately 0.006 cfm/bu and is preferably maintained approximately between 0.0015 cfm/bu and 0.0008 cmf/bu. Hydrogen phosphide (phosphine) gas generated from aluminum phosphide is preferred as the chemical when the process is used for fumigation, but other gaseous fumigants exhibiting a low rate of sorption by agricultural products may also be used.

9 Claims, 1 Drawing Figure

U.S. Patent  Apr. 29, 1980  4,200,657
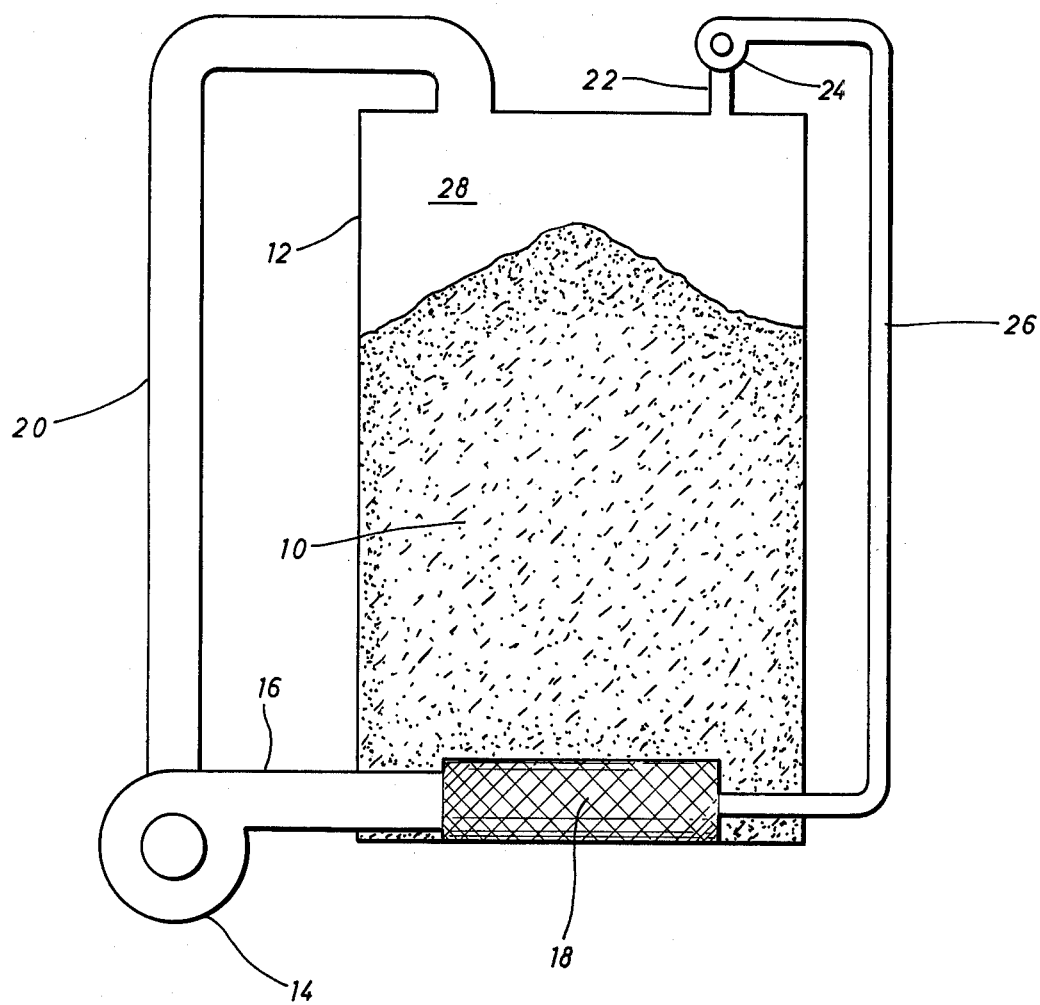

LOW AIR FLOW FUMIGATION METHOD

BACKGROUND OF THE INVENTION

This invention is related to methods for chemically treating stored quantities of agricultural products, such as grain. The invention is particularly related to treatment methods wherein the circulation of air is utilized to distribute a gaseous chemical.

Agricultural products, such as grain, are frequently stored for a period of time, such as between harvesting and further processing of the products. This storage can last for considerable periods of time. Consequently, in order to maintain the quality of the stored product, certain procedures have been followed in the storage industry to keep the product in good condition and prevent deterioration.

The temperature and humidity of the stored product, for example, must be maintained within certain limits to prevent spoilage. This conditioning has sometimes been accomplished by physically turning the grain within the storage facility. Temperature and humidity control has also been implemented by using large fans to aerate the product through a system of vents in the storage container, typically including an aeration manifold underneath the stored product and vents in the roof or upper structure (commonly known as the "overhead") of the storage facility. In this manner, external air may be forced upwardly or downwardly through the volume of stored product.

In addition to the problems caused by excessive temperature or humidity conditions, stored agricultural products are also susceptible to damage from various live pests, such as insects, which eat the product, lay eggs in it, etc. Consequently, as soon as such products are stored, measures must be taken to prevent the substantial degradation which can otherwise occur. Various liquid chemicals have been applied to stored agricultural products to kill such pests and prevent their damaging the stored product. Such liquid fumigants are applied to the top of the stored product, the chemicals being intended to flow downwardly into the product and throughout the volume of the product to reach infestations in all locations. Such liquid applications, however, are an expensive means of control and are difficult to apply so as to ensure a uniform distribution of the chemical throughout the stored product, which is necessary to eradicate an acceptably high percentage of the infestation.

Gaseous fumigants have also been used for this purpose. A gaseous fumigant may be applied through a forced air ventilation system to circulate the fumigant through the stored product and then out through the vent system. This method is known as the "one pass" system of fumigation. In an attempt to further improve the efficiency of the fumigation operation and the uniformity of gaseous fumigant distribution, a recirculating forced air fumigation method was developed in the art. In this method, any existing vents in the storage container are sealed off from the external atmosphere. An air duct is attached to the container above the level of the product (the storage "overhead") and connected to the intake for a fan or blower which supplies air to an aeration system underneath the stored product. The gaseous fumigant is introduced into the duct or into the container and the fan or blower is utilized to force air and the gaseous fumigant through the stored product. The gaseous air and fumigant mixture is then routed to the intake of the blower by the air duct, and is recirculated through the product, the recirculation being continued for a period of time sufficient to achieve an evenly distributed concentration of fumigant throughout the volume of the stored product.

In practicing such circulating treatment methods, the total quantity of fumigating chemicals is typically released over a relatively short period of time of approximately 10 to 40 minutes. Such short release times necessitate the use in this technique of air flow rates which are relatively high in order to achieve a uniform distribution of the fumigant. The distribution of the fumigant is further affected by the chemical properties of the particular fumigants utilized. Such chemicals are subject to sorption by the stored product, i.e., the chemical may be absorbed into a grain or it may be adsorbed by the surface of the grain. Furthermore, some chemical fumigants will break down into other compounds after application. These factors tend to cause an unbalanced concentration of fumigant, with the highest concentrations occurring at locations nearest the point of release of the fumigant. When such constraints are taken into consideration, the air flow rates required in circulating fumigation methods typically are between 0.01 cfm/bu (cubic feet per minute per bushel of stored product) and 0.2 cfm/bu, which flow rates correspond to effecting one complete change of air through the stored product in between 2.5 and 50 minutes. Lower air flow rates have not been used, because it has been found that a less than totally effective kill of the pests will be obtained with lower air flows.

Relatively high capacity ducts and blowers must thus be provided in the traditional practice of this method, the ducts typically ranging between 12 and 36 inches in diameter and the blowers used requiring 5 to 100 horsepower motors. Such large ducts are relatively expensive and the size of the blowers necessitates a relatively large amount of energy use during such traditional fumigation operations.

The flow rate, as mentioned above, is normally expressed in terms of cubic feet per minute per bushel of product (cfm/bu). In this terminology, agricultural products such as grain can be dried with a flow rate of approximately 0.05 cfm/bu. (corresponding to a 10 minute total air change), cooling and conditioning is accomplished with a flow rate of about 0.2–0.05 cfm/bu. (2.5 to 10 minute air change), and fumigation utilizing the recirculation or one pass forced air methods has traditionally been implemented with flow rates ranging approximately between 0.01 and 0.4 cfm/bu., commonly at 0.025 cfm/bu. (corresponding to a 20 minute air change).

One particular fumigating chemical, aluminum phosphide, which may be described as a solid fumigant, is available in the form of tablets, pellets, or bagged powder. Gaseous hydrogen phosphide (phosphine) is generated from solid aluminum phosphide in the presence of atmospheric humidity. Hydrogen phosphide has been used in the past as a fumigant in static applications, but those skilled in the art have maintained that it should not be used in forced air systems. In its solid form it has been applied into grain as the grain is moved from one container to another, it has been distributed onto the top or top and bottom of the grain within a container, and it has been probed into the grain at various depths. Each of these fumigation methods has relied on the penetrating ability of phosphine gas and the convectional currents within a storage facility to provide distribution throughout the stored product. On occasion, aeration systems with high air flows have been used in an attempt to assist in the penetration of the phosphine. Whereas other fumigants will release and achieve a peak concentration of gas in approximately 10 to 40 minutes, however, aluminum phosphide requires a much longer time, from 16 to 30 hours, to release the phosphine gas contained therein, and the correlation between this release time and the proper air flow rate has not heretofore been recognized.

Therefore, a need has developed for a treatment method for grain and other agricultural products which will provide an even distribution of chemicals at air flows related to the release of the gas and a uniformly high rate of kill without the need for large and expensive air recirculating equipment or the need for an excessive amount of chemicals.

SUMMARY OF THE INVENTION

It is a general object of this invention to provide an improved method for the treatment of stored agricultural products.

A method of treating an agricultural product stored in a container, according to this invention, comprises the steps of:
   (a) introducing a gaseous chemical into the container, the chemical being selected for minimal sorption of the chemical by the product, and
   (b) circulating the contained air through the product at a low rate of flow.

In a more particular embodiment utilizing the one-pass technique, the method comprises the steps of:
   (a) placing the product within a closed container,
   (b) providing an air duct into the container,
   (c) introducing a gaseous chemical into the container, the particular chemical being selected for minimal sorption of the chemical by the product, and
   (d) forcing air and the chemical through the air duct at a very low rate of flow, for a time sufficient to evenly distribute the chemical throughout the product.

In a more particular embodiment utilizing the recirculating technique, the method comprises the steps of:
   (a) placing the product within a closed container,
   (b) providing an air duct between the upper and lower portions of the container,
   (c) introducing a gaseous chemical into the container, the particular chemical being selected for minimal sorption of the chemical by the product, and
   (d) forcing air through the air duct at a very low rate of flow, recirculating the air and chemical for a time sufficient to evenly distribute the chemical throughout the product.

In a preferred embodiment, the method is utilized to fumigate agricultural products with a gaseous fumigant provided in the form of phosphine gas derived from aluminum phosphide.

In order to achieve the optimum benefits of this method, the air in the container preferably is recirculated at a rate of flow which is less than approximately 0.006 cfm/bu (1.5 hour air change). Optimum results have been obtained from the method when the rate of flow of the air is maintained between approximately 0.0015 cfm/bu (6.5 hour air change) and 0.0008 cfm/bu (11 hour air change). The method has been successfully tested with an air flow low enough to effect a 3.5 day air change.

This method is particularly useful in fumigating farinaceous products, such as flour and whole or processed grains.

Examples of the more important features of this invention have thus been broadly outlined in order that the detailed description thereof which follows may be better understood, and so that the contributions which the invention provides to the art may be better appreciated. There are, of course, additional features of the invention which will be described herein and which will be included within the subject matter of the claims appended hereto.

BRIEF DESCRIPTION OF THE DRAWINGS

Additional objects, features, and advantages of the present invention will become apparent by reference to the following detailed description of the preferred embodiments thereof in connection with the accompanying drawing. In the drawing:

The FIGURE is a schematic view illustrating a typical storage container arrangement for agricultural products which may be utilized to practice the method of this invention.

DESCRIPTION OF THE PREFERRED EMBODIMENTS

Now referring to the FIGURE, a schematic outline of a grain storage system in which the method of this invention may be practiced is illustrated. In the FIGURE, the agricultural product 10 is stored within a container 12. A blower or fan 14 is connected to the lower portion of the container 12 through an air supply duct 16 and an aeration manifold 18, while a return air duct 20 is connected to the container 12 near the top of the container, and routes air from the container to the intake of blower 14 for recirculation through supply duct 16 and the stored product 10.

In the known method of treatment utilizing the one pass technique, the desired chemical is introduced into the product 10 by utilizing the blower 14 and either duct 16 or duct 20 to force air and the chemical either upwardly or downwardly, respectively, through the product and out vents to the atmosphere.

In practicing gaseous chemical treatment with the recirculation technique, any vents to the atmosphere within the container 12 are first sealed. The recirculation system, consisting of the blower 14 and the associated supply and return ducts 16 and 20, is attached to the container to provide a recirculating air path passing through the container and the stored product 10. The desired chemical for fumigation is then applied within the closed system.

Typically, the chemical in these methods may be applied over the upper surface of the agricultural product 10, although the fumigating or other treating material may be supplied anywhere within the closed system, such as in the supply conduit 16 or the return conduit 20, as best suited to a particular application. The blower 14 is then operated for an appropriate period of time to achieve an even distribution of the gaseous fumigant throughout the volume of the agricultural product 10. After the blower has run for a sufficient period of time to achieve the desired even distribution, the blower is turned off and no further air movement is necessary until it is desired to vent the container in order to aerate the agricultural product and remove the fumigation gas.

Such forced air circulation methods of treatment have heretofore been generally known in the art to persons practicing fumigation of grain and other agricultural products. Prior to the present invention, however, the forced air treatment method has been accomplished with much higher air flows than are required in practicing the present invention.

The blower 14, supply duct 16, and return duct 20 are sized schematically to represent the relatively large size of such components as are typically provided for drying, cooling, conditioning, and treating the product 10 with conventional methods. Also illustrated in the FIGURE are a low flow return duct 22, a low flow blower 24, and a low flow supply duct 26, which are relatively small in size and capacity and may be provided generally for practicing the method of this invention.

The method of this invention may be practiced by the one-pass technique by applying the treating chemical into the overhead area 28 of the container 12. With the container vented to the atmosphere, the gas is drawn downward through the product by blower 24 at a very low flow rate. The blower is then turned off and the vents are sealed. Alternatively, the chemical may be introduced into the bottom of the container 12 and the blower 24 utilized to force the gas upward through the product 10, again at a very low flow rate.

The one-pass technique of this invention may also be implemented utilizing larger capacity circulation equipment, such as blower 14, supply duct 16, and return duct 20. When the larger, conventional equipment is used, the very low air flows necessary to practice the present invention may be achieved by running the larger blower, such as blower 14, for from one to five minute periods spaced at intervals of three to four hours. When the higher capacity systems are utilized, however, extreme caution must be observed since such systems operate with much higher pressures, requiring that all leaks in the system must be sealed.

The method of this invention may similarly be practiced with the recirculating treatment technique, in which external vents of the container 12 are sealed and the blower 24 and ducts 22 and 26 are used to recirculate the chemical at a very low flow rate for a period sufficient to effect an even distribution. As with the one-pass method, the recirculating technique may be practiced according to this invention utilizing conventional, higher capacity air flow systems, when the blower is cycled on for very short intervals and when suitable precautions, in view of the higher pressures, are implemented.

It is an outstanding feature of this invention to provide a circulating chemical treatment method requiring much lower rates of air flow than in previously known methods. In the method practiced according to the prior art, for example, rates of flow of 0.01 cfm/bu and higher are commonly used, so that a complete change of air within the product is achieved within 50 minutes or less. It has been found, however, that more effective results with slow generating or slowly introduced low sorption chemicals can be obtained more efficiently while using rates of flow which are much lower in combination with the properly selected treating chemical.

In the prior art methods, the rate of flow must be maintained relatively high because it has been found that at lower flow rates, the treating chemical is preferentially absorbed by the grain or other agricultural product closest to the point at which the gas is introduced to the storage container. Hydrocyanic acid, ethylene dibromide, and ethylene dichloride, for example, chemicals which have commonly been used as fumigants for agricultural products, tend to be highly sorptive with respect to agricultural products. This high sorption characteristic results in an unbalanced distribution of the fumigant over the volume of the product.

Consequently, in the prior art methods, in order to achieve an effective kill of pests throughout the stored product, large capacity air flow equipment and an extended application time must be utilized, so that all portions of the stored product receive sufficient concentrations of the fumigant to achieve the desired kill, resulting in increased costs and additional difficulties in subsequently aerating the stored product to remove residual concentrations of the fumigating chemicals. A further incident of the higher rates of flow is increased leakage of the fumigating gas under the attendant higher pressure differentials, resulting in still additional amounts of gaseous fumigant which are required in prior art methods, along with associated hazards.

It has been found by the present inventors, however, that by selecting a gaseous chemical which is sorptive to only a very small extent by agricultural products, or not at all, and by slowly releasing such a chemical, the rate of flow of the circulating air in the treatment may be drastically reduced while achieving improved results at a lower cost of materials and power. In practicing a fumigation method according to the present invention, for example, flow rates are utilized which are less than approximately 0.006 cfm/bu. Preferably, flow rates between 0.0015 cfm/bu and 0.0008 cfm/bu are utilized and have been found to provide excellent distribution of the gaseous fumigant. These flow rates correspond to a complete air change through the stored product in from 6.5 to 11 hours.

In the preferred embodiment of the method according to this invention, inhibited phosphine gas is utilized as the gaseous fumigant. The phosphine fumigant may be obtained from aluminum phosphide, which is available in the form of tablets, pellets, or bags. The aluminum phosphide may be applied at various points within the air recirculation system, as best suited to a particular application.

Although this method has been practiced with the use of aluminum phosphide to provide phosphine gas as a fumigating material, it will be understood by those skilled in the art that other gaseous fumigants may also be utilized in this method, provided that the fumigant is selected to be one which is relatively non-sorptive with respect to agricultural products. Furthermore, the invention may also be practiced with other low sorption chemicals to achieve treatments other than fumigation, such as, for example, deodorizing.

The features and advantages of this invention may be more fully explained and illustrated through several examples.

EXAMPLE I

Three identical steel welded grain tanks, approximately 40 feet tall and 114 feet in diameter, were loaded and leveled to about 36 feet of depth with 320,000 bushels of long grain rough rice. All tanks were tightly sealed. A two horsepower blower with a 6 inch intake and 4⅜ inch exhaust was used on the latter two tanks. A 6 inch sheet metal return pipe was erected from the top of each tank to the fan intake. A short 6 foot section of 4 inch flexible hose was connected from the fan exhaust to the central collection system in the bottom of the tank. A 0.00125 cfm/bu rate of air flow resulted, with about an 8 hour air change within the rice mass.

As a control comparison, the first tank was fumigated following Phostoxin$^R$ (a trademarked brand of aluminum phosphide) label recommendations, without air circulation. Two cases of Phostoxin$^R$ tablets (approximately 40 tablets per 1,000 bushels of rice) were scattered evenly over the rice surface. The fumigation was considered complete and the test concluded after 500 hours (21 days).

In the first tank, high overhead concentrations in excess of 2400 ppm were recorded. The gas required 5 days to penetrate to the bottom of the tank with sublethal concentrations of 10-15 ppm. After 21 days, the bottom concentration had not exceeded 20 ppm, although a minimum concentration of 50 ppm would have been preferred.

The second tank was treated using the air recirculation system. Two cases of Phostoxin$^R$ (approximately 40 tablets per 1,000 bushels) were scattered evenly over the rice surface. After about 3 hours, when overhead concentrations of fumigant had reached 490 ppm, the blower was turned on and, except for a short interruption, was run continuously for about 13 hours. After 10 hours of inactivity, the fan was turned on again for about 8 hours, running a total of about 21 hours for the test. The blower was discontinued at this time and the test was concluded after 201 hours (8.3 days). A complete distribution of 450 ppm was obtained throughout the tank within 8 hours after the application. Even and lethal concentrations were maintained, resulting in complete pest control within a 5.5 to 8 day exposure.

The third tank was treated using air recirculation with one case of Phostoxin$^R$ (approximately 20 tablets per 1,000 bushels). The tablets were pulverized and blown into the space above the rice from one position. After 1½ hours of exposure, with a 650 ppm reading over the rice, the fan was turned on and run continuously for an additional 18½ hours. The analysis was discontinued and the fumigation considered complete after 135 hours (5.67 days). With half the previous dosage, complete distribution of the gas was attained within an 8 hour period. Total control was achieved in 5.67 days.

EXAMPLE II

A steel walled flat storage building 90 feet by 360 feet long with 40 foot high walls contained four 90 feet by 90 feet bins with a capacity of 1,100,000 bushels. Each bin was loaded to a leveled depth of 36 feet, containing 720,000 bushels of rough rice. 80 tablets of aluminum phosphide per 1,000 bushels of rice were blown into the overhead ends of the building through a 2¼" diameter tube connected to a 1½ horsepower high speed fan. A fan was connected to a lower aerating manifold under each bin. The air flow rate was calculated to be approximately 0.0015 cfm/bu (6 hour total air change). A natural infestation of rice weevils and lesser grain borers was controlled and the rice was shipped out in about four months free of any living infestation. Complete distribution was attained within 6 hours, with concentrations well within the tolerances set for good controls.

EXAMPLE III

Two identical grain storage tanks made of corrugated steel, 72 feet in diameter, with a 51 foot eave and a 72 foot peak, having a rated capacity of 198,000 bushels, were loaded with 196,350 bushels of No. 2 yellow milo. A 6 inch pvc pipe was installed in the roof 2 feet to 3 feet over the eave line, and was routed down the outside wall to within 5 feet of the ground. A manifold of pvc pipe and flexible tubing connected the return pipe to a two horsepower blower, with the supply from the blower connected to the aeration system in the bottom of the tank under the grain. Air pressure calculations indicated an approximate air flow rate of 0.0025 cfm/bu (3.5 hour air change). Both tanks were fumigated with identical dosages of approximately 80 tablets per 1,000 bushels, using 2 cases (14,400 tablets) of Phostoxin$^R$ tablets per tank.

In the first tank the full dosage was broadcast over the grain surface on the side opposite from the return air line. The fan system was turned on soon after all the tablets were introduced and was allowed to run for 12 hours. 7 Hours later it was reactivated for an additional 5½ hours, bringing the total fan time to 17½ hours, or until 24 hours of fumigation exposure had occurred. An even and complete distribution was attained in 3.5 hours and complete results were attained.

In the second tank 9600 tablets (⅔ of the dosage) were broadcast into the overhead area and the remaining 4800 tablets were thrown into the four aeration ducts in the bottom of the tank. There was no air flow utilized. Erratic concentrations of fumigant were recorded at various locations from the top to the bottom of the tank. 2.5 Days were required for the gas to penetrate to the middle of the tank.

The advantages of this invention may be summarized by comparing various treatment parameters for a typical tight steel storage tank with a 200,000 bushel capacity. Aeration and conditioning may be accomplished in such a tank with a flow rate of 0.1 cfm/bu, requiring a 20 horsepower blower supplying a 48 inch diameter duct to achieve 20,000 cfm. Traditional recirculating fumigation methods typically would utilize a flow rate of 0.025 cfm/bu, which could be supplied by a 3-5 horsepower blower and a 36 inch duct. In comparison, the fumigation method of the present invention may be practiced in such a tank with a flow rate of 0.001 cfm/bu, requiring only a ⅓ horsepower blower supplying a 4.5 inch diameter duct. The method may be effectively practiced at even lower flow rates of 0.0008 cfm/bu, with even smaller equipment.

The advantages of the invention may be further evidenced by a comparison of dosage rates required for the application of aluminum phosphide. Label instructions recommend 180 tablets per 1000 bushels, while general usage in the trade has involved 40 to 80 tablets per 1000 bushels, leading to effective controls in 8 to 10 and 8 to 21 days, respectively. Utilizing the method of the present invention, however, no more than 20-40 tablets per 1000 bushels need be used to obtain effective controls in 5.5 to 6 days.

Although typical embodiments of the present invention have been illustrated and discussed herein, further modifications and alternative embodiments of the method of this invention will be apparent to those skilled in the art in view of this description. Accordingly, this description is to be construed as illustrative only and is provided for the purpose of teaching those skilled in the art the manner and technique of practicing the method of this invention. It is to be understood that the forms of the invention shown and described herein are considered the presently preferred embodiments, although various changes might be made in the configurations, sizes, and arrangements of the parts and steps utilized, as will be recognized by those skilled in the art without departing from the scope of the invention. Equivalent steps, for example, might be substituted for those illustrated and described herein, and certain features of the invention might be utilized independently of the use of other features, all as will be apparent to one skilled in the art after receiving the benefit obtained through reading the foregoing description of the invention.

What is claimed is:

1. A method of fumigating an agricultural product stored in a container, comprising the steps of:
   introducing a gaseous chemical fumigant into the container, the fumigant being selected for minimal sorption of the fumigant by the product; and
   forcing the fumigant and air through the product at a flow rate such that said product undergoes one gaseous volume change in a time period of not less than 1.5 hours.

2. The method of claim 1, wherein the agricultural product fumigated is a farinaceous product.

3. The method of claim 2, wherein the product fumigated is a grain.

4. The method of claim 2, wherein the product fumigated is a processed grain.

5. The method of claim 1, wherein the fumigant used is phosphine gas.

6. The method of claim 5, wherein the phosphine gas is obtained from aluminum phosphide.

7. The method of claim 6, wherein said time period is in the range of from about 1.5 hours and 3.5 days.

8. The method of claim 7, wherein said time period is in the range of from about 6.5 hours to about 3.5 days.

9. The method of claim 8 wherein said time period is in the range of from about 6.5 hours to about 11 hours.

* * * * *